United States Patent

Grossman et al.

[11] Patent Number: 5,835,730
[45] Date of Patent: Nov. 10, 1998

[54] MPEG PACKET HEADER COMPRESSION FOR TELEVISION MODEMS

[75] Inventors: Michael A. Grossman, San Diego; Jonathan A. Fellows, Del Mar; Clive E. Holborow, San Diego, all of Calif.

[73] Assignee: General Instrument Corporation of Delaware, Horsham, Pa.

[21] Appl. No.: 688,841

[22] Filed: Jul. 31, 1996

[51] Int. Cl.$^6$ ........................................ H01J 13/00
[52] U.S. Cl. ..................... 395/200.77; 395/888; 341/60
[58] Field of Search .................. 395/200.77, 888; 341/60

[56] References Cited

U.S. PATENT DOCUMENTS

| | | | |
|---|---|---|---|
| 5,045,993 | 9/1991 | Murakami et al. | 395/583 |
| 5,191,326 | 3/1993 | Montgomery | 340/855.5 |
| 5,271,010 | 12/1993 | Miyake et al. | 370/94.1 |
| 5,347,304 | 9/1994 | Moura et al. | 348/12 |
| 5,576,765 | 11/1996 | Cheney et al. | 348/407 |
| 5,579,183 | 11/1996 | Van Gestel et al. | 360/48 |

*Primary Examiner*—Frank J. Asta
*Assistant Examiner*—Daniel Patru
*Attorney, Agent, or Firm*—Barry R. Lipsitz; Ralph F. Hoppin

[57] ABSTRACT

A method and apparatus are provided for receiving a packet stream having fixed length packets. Data carried in the packet stream is selectively processed for output to a computer. A packet identifier filter selects particular packets from the recovered packet stream. A computer disk controller receives the packets selected by the filter and manages the transfer of packet data from the packets to and from a buffer. A data bus is coupled to the disk controller for communicating the packet data from the buffer to the computer. A data compression stage prior to the disk controller compresses packets from the recovered packet stream in order to provide a gap between data carried by successive packets to be provided by the disk controller. In this manner, a low cost disk controller chip can be used to control the buffering of data in a cable or satellite television modem that provides, e.g., Internet access.

22 Claims, 3 Drawing Sheets

MPEG PACKET HEADER COMPRESSION FOR TELEVISION MODEMS

BACKGROUND OF THE INVENTION

The present invention relates to the processing of data carried in a fixed length packet format packet stream, and more particularly to the compression of packet headers to provide the data in a format which simulates data accessed from a computer disk. Such packet streams include, for example, Moving Picture Experts Group (MPEG) and asynchronous transfer mode (ATM) packet streams. The invention has particular application in the provision of a low cost cable or satellite television modem for Internet access.

The recent increase in Internet usage has created a largely unsatisfied demand for high speed connectivity to Internet service providers. High end analog telephone modems currently operate at only 28.8 kilobits per second (kbps). Such modems are not fast enough to give users satisfactory response time for many of the operations they desire to accomplish. Integrated service digital networks (ISDN) operate up to 128 kbps, but are significantly more expensive to use than standard telephone access. Rates even higher than those provided by ISDN are desired, especially in the downstream (i.e., Internet to user) direction.

One alternative to conventional analog telephone modems and ISDN services is to access Internet services with modems that can operate on cable or satellite television networks. Such networks have much greater bandwidth than is provided by telephone lines, and can therefore be advantageously used for high speed Internet communications. Currently, most CATV networks (and all television satellite networks) are one-way broadcast networks. Such networks only provide communication from a headend to a user, and not in the reverse direction. Although the industry is upgrading to two-way ("bidirectional") CATV networks at a high rate, more than half of the one-way networks presently in existence are expected to remain into the foreseeable future.

It would be advantageous to provide a method and apparatus that enables Internet access via a one-way CATV or satellite television network. It would be further advantageous to provide a cable or satellite modem that is low in cost, in order to enable cable and satellite television operators to provide low cost, high speed Internet access to their customers. It would be still further advantageous to provide low cost Internet access to the vast population of cable and satellite television subscribers.

The present invention provides methods and apparatus having the aforementioned and other advantages.

SUMMARY OF THE INVENTION

A method in accordance with the present invention provides a gap between consecutive packets in a packet stream carrying fixed length packets. A packet header is located for a first one of the packets. Any known or calculable fields K-bits in total are deleted from the header. A fixed synchronization byte is an example of such a field. An N-bit packet identifier (such as an MPEG PID or an ATM VPI or VCI) from the header is coded into an M-bit reference value, where M is less than N. In this manner, the deleting and coding steps compress the header to provide a gap equivalent to K+N−M bits between the first packet and an adjacent packet. The gap simulates that found between data bursts output from a computer disk drive, and enables a low cost disk controller to be used for processing the data carried on the packet stream. It should be appreciated that if a sufficient gap can be provided by only deleting one or more fields, the coding of the packet identifier will not be required. Alternatively, if enough bits can be eliminated by coding one or more packet identifiers, then the deletion of one or more fields can be avoided.

The compression provided by the above procedure is a lossless compression scheme. If a particular application warrants it, all known or calculable fields can be deleted to maximize the compression. The header can be decompressed by inserting the K-bit field(s) (e.g., synchronization byte) back into the header, decoding the M-bit reference value to recover the N-bit packet identifier, and substituting the M-bit reference value in the header with the recovered N-bit packet identifier.

In an illustrated embodiment, an MPEG packet header is compressed by deleting a synchronization byte from the header and coding an N-bit packet identifier (PID) from the header into an M-bit PID reference, where M<N. In order to decompress the header, the synchronization byte is inserted back into the header, the M-bit PID reference is decoded to recover the N-bit packet identifier, the M-bit PID reference in the header is removed, and the recovered N-bit packet identifier is inserted into the header.

Apparatus is disclosed for receiving a packet stream via, e.g., an RF communication channel, and selectively providing data carried in the packet stream to a computer. A receiver is provided for recovering the packet stream from, e.g., the RF communication channel. A packet identifier filter is used to select particular packets from the recovered packet stream. The packets selected will be those that are intended to be provided to a particular user. A disk controller receives the packets selected by the filter and manages the transfer of packet data from the packets to and from a buffer. The disk controller is coupled to a data bus. After retrieving packet data from the buffer, the disk controller provides the data as output on the data bus in order to communicate the data to the computer. A data compression stage is provided prior to the disk controller. This stage compresses packets from the recovered packet stream in order to provide a gap between successive packets provided to the disk controller. In this manner, the data from the selected packets is provided to the disk controller in a format that simulates data coming from a computer disk, such as a hard drive, CD ROM drive, or floppy drive.

The header portions compressed by the apparatus can comprise, for example, packet headers of an MPEG or ATM packet stream. The compression stage can compress the packet header by deleting a synchronization byte (e.g., an MPEG sync byte or ATM header error correction byte) therefrom, and coding an N-bit packet identifier from the transport header into an M-bit reference value, where M<N. In an example embodiment, the compression stage comprises a lookup table for coding the N-bit packet identifier into the M-bit reference value. If the synchronization byte has a known or calculable value, the compression provided will be lossless. If warranted by the particular implementation, all known or calculable fields are deleted from the header to maximize the compression. However, at a minimum, only enough bits need to be deleted as are required to provide a large enough gap to enable the disk controller to process consecutive packets from the packet stream. In order to decompress the compressed header, the N-bit packet identifier is retrieved from the lookup table using the M-bit reference value, and the packet identifier is inserted back into the header together with the synchronization byte.

The compression stage can use index coding to provide the M-bit reference value. For example, $2^{M/2}$ possible reference values can be designated by a most significant bit (MSB) having a first binary value. The remaining $2^{M/2}$ possible reference values are designated by a most significant bit (MSB) having a second binary value.

The disk controller can comprise any type of disk controller that is designed to accept data read from disks in which gaps are present between disk sectors. Examples include integrated drive electronics (IDE) and small computer system interface (SCSI) controllers. The packet stream can comprise any digital stream in which consecutive fixed length packets are carried. Examples include an MPEG Transport Stream and an asynchronous transfer mode (ATM) packet stream.

DETAILED DESCRIPTION OF THE INVENTION

In order to provide a CATV (or satellite) modem for use on one-way CATV (or satellite) networks, a telephone modem can be provided for the link from the receiver to the headend, with the CATV or satellite network being used to provide high speed downstream data. The telephone modem is also used to initiate and set up a communication session.

Figure 1:
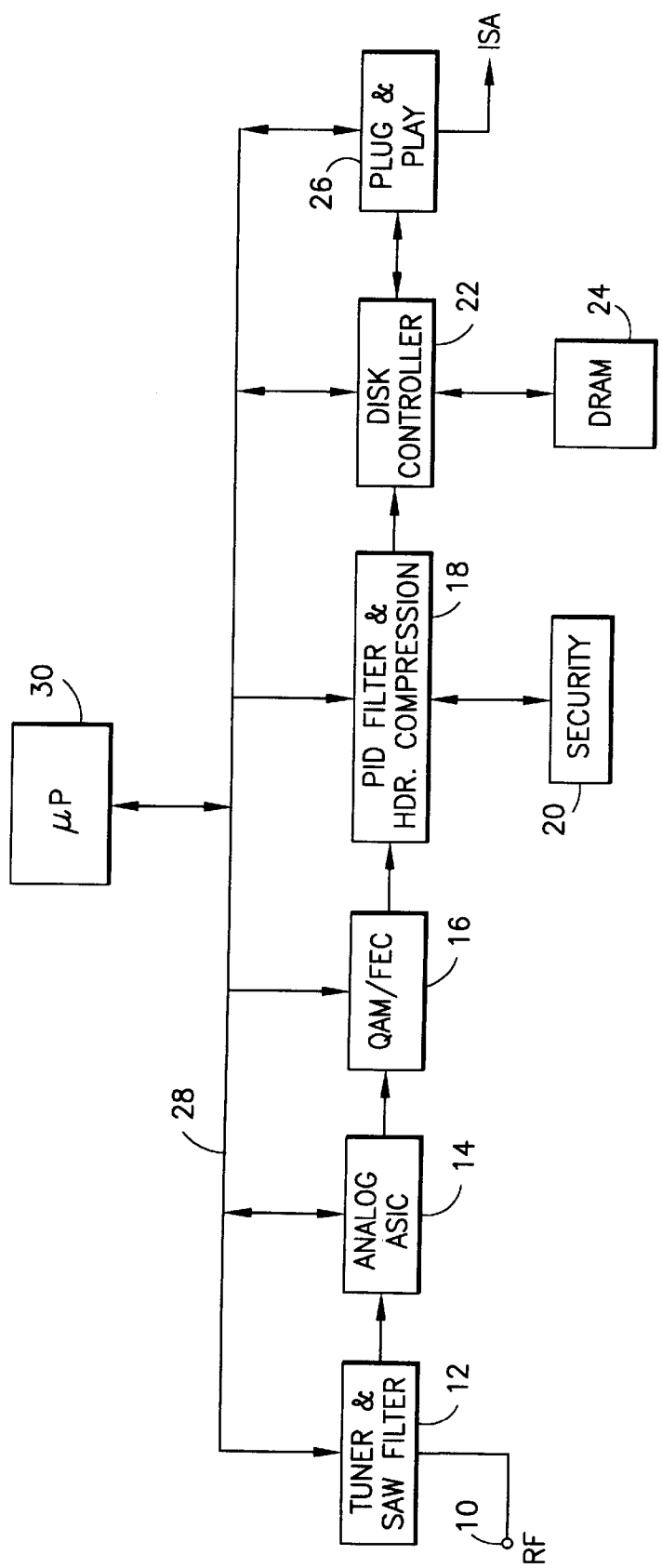
FIG. 1 is a block diagram of apparatus in accordance with the present invention.

FIG. 1 illustrates the downstream receiver functions of such a cable modem. Hereinafter, the term "cable modem" is used to mean both cable and satellite television modems, and "CATV" is meant to apply to either a cable or satellite television network.

The downstream radio frequency (RF) signal from the CATV network is input to a tuner and SAW filter 12 via terminal 10. The downstream link can use, for example, 64 QAM modulation in a standard six MHz CATV channel. The traffic of many users is multiplexed into a continuous stream of consecutive fixed length packets. For example, a Moving Picture Experts Group (MPEG) or asynchronous transfer mode (ATM) packet stream can be used in connection with the present invention. Although the invention will be described hereinafter in connection with an MPEG Transport Stream, it should be appreciated that the illustrated embodiment is by way of example only, and is not intended to restrict the scope of the invention to any particular fixed length packet format transport scheme. Nor, is the invention limited to use with a one-way communication network; it is equally applicable to use with bidirectional networks such as a two-way CATV network.

User interface units, such as the receiver illustrated in FIG. 1, receive the entire multiplexed stream, and select only those packets intended for the particular user. The selection function is provided by a packet identifier filter (e.g., PID filter 18) described in greater detail below.

Tuner 12 selects a desired channel from the downstream transmission, and passes the channel through a surface acoustic wave (SAW) filter. The filtered channel is input to an analog application specific integrated circuit (ASIC) which provides automatic gain control, further bandpass filtering and an analog-to-digital (A/D) conversion. The A/D converter is clocked by an external reference at rates high enough to accurately transpose the signal into the digital domain. The resulting A/D output is passed to a quadrature amplitude modulation (QAM) demodulator and forward error correction (FEC) decoder 16, where the QAM constellation is decoded in accordance with well known demodulation techniques. The resultant digital stream is processed by a suitable FEC function to decode the data stream. Such FEC functions are well known.

The error corrected output data flows from the QAM/FEC decoder 16 to a packet identifier filter and header compression function 18. In an MPEG implementation, the packet identifiers are referred to as PIDs, and function 18 will comprise a PID filter which selects those packets intended for the particular user. In order to select those packets designated for the user, the PID filter simply monitors the PIDs on each packet, and retrieves the packets identified by the PIDs which the user is supposed to receive. Data packets not destined for the particular user will be filtered and ignored. The PID identifies the data stream that is carried in the associated transport packet.

An optional security function 20 can be provided if the received data is encrypted. In this event, the PID filter function will route the received data to the decryption input of the security processor 20. The security processor will perform decryption on the data from the serial data stream that are destined for the user, producing a delayed clock and sync signal to accompany its delayed data output. Such security processors are well known in the art. The decrypted data output is then passed back to the PID filter.

Once the appropriate packets have been filtered by the PID filter, those destined for the user will be compressed using a header compression scheme in accordance with the present invention. In the preferred embodiment, a lossless compression scheme is used. It is noted that although the header compression could be performed on all of the received packets, it is more efficient to only compress those headers from packets which are destined for the particular user. Moreover, the invention can be implemented to compress only those headers destined for the particular user which reside in consecutive, adjacent packets in the transport stream. If two packets destined for a user are not adjacent, but are spaced apart in time, the gap provided by the compression will not be necessary since the disk controller (described below) will have sufficient time to process the spaced packets when they arrive.

Header compression is provided in order to enable the receiver apparatus to use a low cost disk controller 22 to convert the high speed serial data bursts recovered from the packet stream into parallel form and to transfer the data to and from a buffer memory provided by DRAM 24. The disk controller can be provided in the form of a low cost integrated circuit, such as part no. AIC-8375 available from Adaptec, Inc. of Milpitas, Calif.

Although such disk controller chips are low cost and readily available, they are not ideally matched to the processing of data from an MPEG Transport Stream, or the like. In particular, data read from computer disks has gaps between disk sectors, and the disk controller designs take advantage of this. Thus, the disk controllers cannot simultaneously recognize that a block of data needs to be saved and begin to save the data at the same time. These must be sequential events, mandating a gap between the packets that are to be saved.

It is possible that in a cable modem of the type described herein, two consecutive received packets will be addressed to the same user. Thus, the cable modem hardware design must allow for consecutive packet writes to the buffer memory 24. The incoming data, however, has no gaps between the packets. In order to overcome this problem, the present invention compresses the packet header in the data written into the buffer, thereby creating a gap between the end of one packet write and the beginning of the next packet write. Preferably, the compression will be reversible, so that the driver software in the user's computer (e.g., a personal computer) can reconstruct the entire transport packet if needed.

The present invention can be used to provide a gap between consecutive packets in any packet stream in which fixed length packets have packet headers. Examples are packet streams which follow the Moving Picture Experts Group (MPEG) standard and asynchronous transfer mode (ATM) packet streams. By providing such a gap, the received data will simulate data arriving from a computer disk drive, which is what the disk controller 22 expects to see.

An MPEG transport stream packet is 188 bytes. The packet header occupies the first four bytes, leaving 184 bytes for payload. See, e.g., "Generic Coding of Moving Pictures and Associated Audio: Systems," ISO/IEC 13818-1, 13 Nov. 1994. The fields of the MPEG transport header are:

| | |
|---|---|
| Synchronization | 8 bits |
| Error Indicator | 1 bit |
| Payload Unit Start Indicator | 1 bit |
| Priority | 1 bit |
| Packet Identifier (PID) | 13 bits |
| Scrambling Control | 2 bits |
| Adaptation Field Control | 2 bits |
| Continuity Counter | 4 bits |

Figure 2:
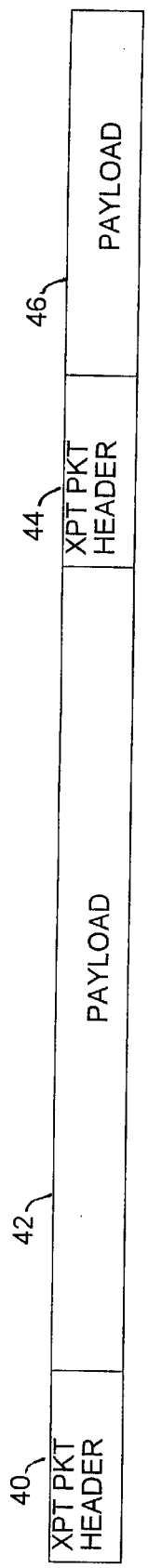
FIG. 2 is a diagram illustrating the format of a conventional packet stream having fixed length packets.
Figure 3:
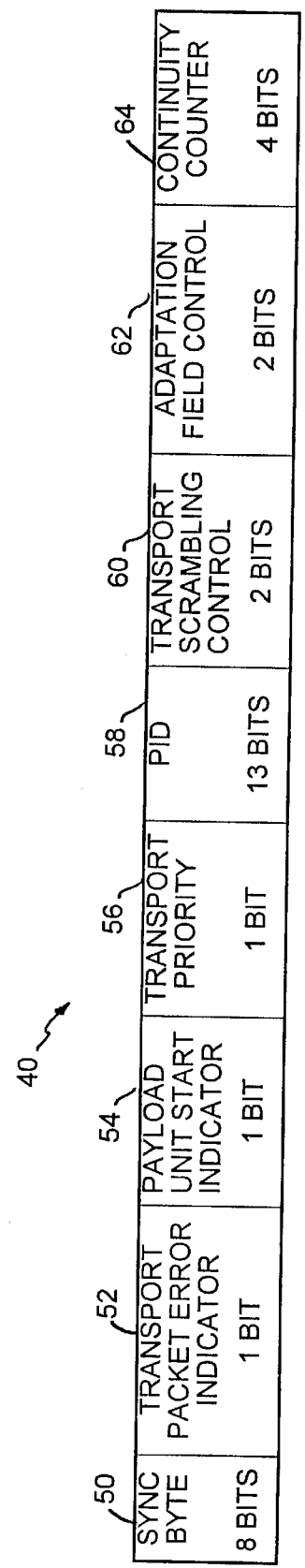
FIG. 3 illustrates the format of a packet header in an MPEG Transport Stream.

An illustration of an MPEG Transport Stream and the transport packet header in particular is provided in FIGS. 2 and 3. In FIG. 2, it can be seen that payload data 42 is preceded by a transport packet header 40. A next transport packet header 44 follows the payload information, and in turn is followed by additional payload data 46. The transport packet header 40 is illustrated in greater detail in FIG. 3. In particular, the transport packet header includes the above-mentioned sync byte 50, transport packet error indicator 52, payload unit start indicator 54, transport priority bit 56, PID 58, transport scrambling control bits 60, adaptation field control bits 62, and continuity counter bits 64.

In order to simulate the output format of a computer disk drive, a gap must be provided (e.g., two bytes must be eliminated) from the header data written into the buffer memory (DRAM 24) by the disk controller 22. In an MPEG implementation, the synchronization byte 50 is always the same value, so it can be eliminated. Synchronization is not an issue when fixed length packets are stored in memory. Simple address arithmetic allows software to locate the start of any packet.

A second byte can be eliminated by coding the MPEG PID field 58 into five bits from its original 13 bits. Each service delivered in an MPEG Transport Stream is carried in a small number of PIDs. The decoder will select the packets being used by a desired service by their PID identification. The remaining packets, which are not necessary in recovering the desired service, are discarded. Reducing the 13-bit PID field to five bits allows up to 32 PID streams to be selected by a receiver. This number of streams is adequate for most purposes, and particularly where the present scheme is being used simply to surf the Internet.

Figure 4:
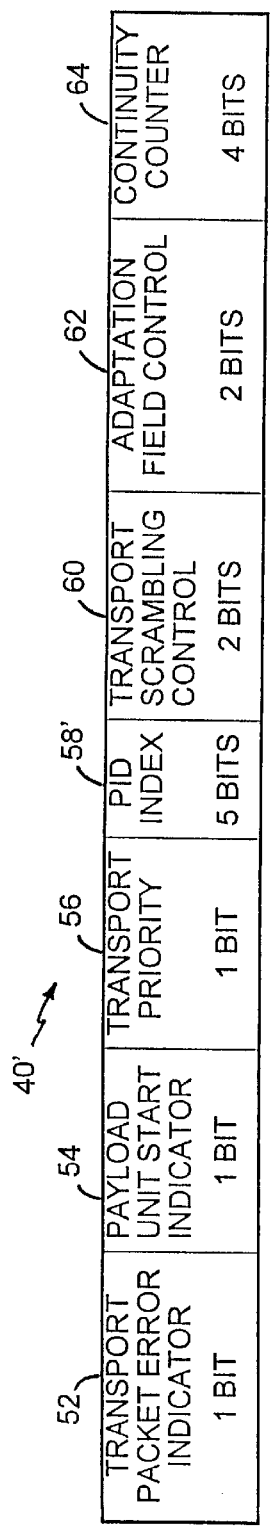
FIG. 4 illustrates an MPEG transport packet header that has been compressed in accordance with the present invention.

FIG. 4 illustrates a compressed MPEG header in accordance with the invention. In particular, the header will comprise only 16 bits (two bytes) instead of the original 32 bits (four bytes). As indicated in FIG. 4, in the compressed header the sync byte has been eliminated and the PID has been reduced from 13 bits to a five bit PID index 58'. The remaining fields remain the same as illustrated in FIG. 3.

Figure 5:
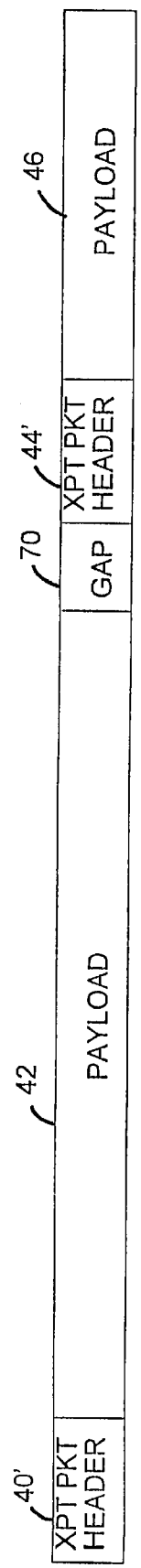
FIG. 5 illustrates a packet stream in which a gap is provided to simulate a computer disk drive output format, in accordance with the present invention.

The result of compressing the header is illustrated in FIG. 5. In particular, the compressed transport packet header 40' provides room for a 16-bit gap 70 between the end of payload data 42 and the next transport packet header 44'. This gap will enable the disk controller 22 to recognize that a block of data (e.g., payload 42) needs to be saved and then save the data with a sufficient time margin to enable transport packet header 44' to be decoded in order to save consecutive payload data 46. Thus, the disk controller is now able to allow for consecutive packet writes to the buffer memory provided by DRAM 24.

The header compression disclosed herein is reversible (i.e., lossless) since the synchronization byte is known and can be added back to the compressed header, and the PID can be reconstructed using, e.g., a lookup table.

In one implementation, PID filter and header compression function 18 have a lookup table of up to 32 PIDs which is replicated in the driver software utilized by the personal computer (PC) which the user uses to receive the buffered data output by disk controller 22. The data is output to the user's PC via bus 28 and plug and play circuit 26, which is a conventional interface well known in the art for outputting formatted data to the PC's industry standard architecture (ISA) internal bus. Alternatively, external communication with the PC could be provided using, for example, an Ethernet interface or the PC's printer port.

Control of bus 28 is provided by a microprocessor 30, which also communicates with the other components in FIG. 1 in a conventional manner. When storing data in the buffer provided by DRAM 24, the PID field is replaced by the index of the PID from the lookup table. The driver software in the user's PC can reconstruct the original packet by performing the inverse PID substitution (using the lookup table) and, if desired, adding back the fixed synchronization byte. In this manner, the standard transport packet header 40 illustrated in FIG. 3 is reconstructed from the compressed header 40' illustrated in FIG. 4.

There are many possible encodings for the five-bit PID index field in addition to the simple direct coding (i.e., lookup table) of 32 PIDs described above. One variation which can be advantageously used to save PID comparison registers is to use "index coding" to code a first block of 16 PIDs with the set of index values 0XXXX, and to code a second block of 16 PIDs with the index values 1XXXX, where X can be binary 0 or 1 and "XXXX" are the four least significant bits (LSBs) of the PIDs being received. This allows a single PID comparison register to ignore the four LSBs of the PID to select a block of 16 PIDs. This approach can be matched to the advanced television system committee (ATSC) "program paradigm" PID allocation scheme set forth in ATSC document A/53, "Digital Television Standard," and allows a single index value (and single hardware comparison register) to select all 16 PIDs associated with a program. Those skilled in the art will appreciate that other PID encodings, which may be more or less complex, may alternatively be used.

Although the invention has been described in connection with an MPEG implementation, it can also be implemented in conjunction with other transport streams in which fixed length packets are used. An example is an ATM packet stream (also known as an ATM "cell stream"). In an ATM implementation, the synchronization byte, referred to as a header error correction (HEC) byte, is not known a priori, but can be calculated. Thus, the HEC byte can be removed in order to compress the header and reconstructed via calculation at the user's PC in order to decompress the header. Furthermore, instead of coding a PID in order to reduce the bit count, as described above in connection with the MPEG implementation, one or both of an ATM virtual path identifier (VPI) and virtual circuit identifier (VCI) can be coded in a similar manner. As is well known to those skilled in the art, ATM uses a two-step addressing scheme, in which one VPI can have several VCIs. Either or both can be compressed using a lookup table, index coding, or other scheme that can be reversed by the driver software in a user's PC.

In alternative implementations, the header can be compressed by only deleting known or calculable fixed length fields, or by only coding fields to reduce their length. For example, in an ATM implementation, it may be possible to obtain a sufficient gap by deleting the generic flow control (GFC) and HEC fields, without coding the VPI or VCI. Two bytes of compression can also be obtained by coding the VPI and VCI, without the deletion of any fields. Alternatively, a required gap may be obtainable by deleting the VPI and coding the VCI. Other alternative implementations will be apparent to those skilled in the art based on the present disclosure.

It should now be appreciated that the present invention provides a means for the lossless compression of headers in a fixed length transport packet stream. The invention can be advantageously used in a system that provides high speed networking (e.g., Internet access) to a user over existing cable television networks, such as hybrid fiber coax networks. A low cost disk controller such as an integrated drive electronics (IDE) or small computer systems interface (SCSI) integrated circuit chip can be used to control the buffering of data received via the transport stream prior to forwarding it to a user's PC.

In order to take advantage of a low cost disk controller chip, the data is processed to simulate data output from a computer disk drive. This is accomplished by compressing (e.g., selectively) the packet headers in order to provide a gap between consecutive packets which may have to be input to the PC. Thus, the present invention provides an economical and vertically integrated means for collecting serial data into a local buffer. A microprocessor is provided for setting disk controller parameters and monitoring status/errors via a local microprocessor interface on the disk controller chip. The microprocessor can also be used for additional configuration and monitoring needs. An ISA plug and play compliant interface function provides conventional remapping of addressing and chip selects as well as remapping of interrupt management and direct memory access (DMA) request/acknowledge lines, as well known in the art. The received downstream data output from the buffer is retrieved by the user's PC, via the ISA bus, for further processing and distribution to the appropriate application level software, such as an Internet navigator.

Although the invention has been described in connection with various specific embodiments, it should be appreciated that various modifications and adaptations may be made thereto without departing from the scope of the invention as set forth in the claims.

We claim:

1. A method for processing consecutive fixed length packets of a packet stream to simulate a computer disk drive output format which requires a temporal gap between successive ones of said packets, including a first packet and an adjacent packet, comprising the steps of:

locating a packet header for said first packet; and performing at least one of a deleting and coding step to reduce an amount of data in said first packet corresponding to said temporal gas, where said deleting step comprises deleting at least one known or calculable fixed length field from said header and said coding step comprises coding an N-bit packet identifier from said header into an M-bit reference value, where M<N;

wherein said at least one deleting and coding step compresses said header to provide said gap between data from said first packet and said adjacent packet.

2. A method in accordance with claim 1 wherein both said deleting and coding steps are performed, said deleting step deletes a total of K-bits from said header, and the gap is equivalent to K+M−N bits.

3. A method in accordance with claim 2 comprising the further steps of decompressing said header by:

inserting said at least one fixed length field back into said header;

decoding said M-bit reference value to recover said N-bit packet identifier; and substituting said M-bit reference value in said header with said recovered N-bit packet identifier.

4. A method in accordance with claim 2 wherein said packet stream is an MPEG Transport Stream, said fixed length field is a K-bit MPEG synchronization byte, and said N-bit packet identifier is an MPEG packet identifier (PID).

5. A method in accordance with claim 1 wherein said packet stream is an ATM cell stream and said N-bit packet identifier is at least one of a virtual path identifier (VPI) and a virtual circuit identifier (VCI).

6. A method in accordance with claim 1 wherein said fixed length field is at least one of a calculable ATM header error correction (HEC) field and a generic flow control (GFC) field.

7. A method for compressing a packet header from a first data packet of a digital packet stream comprising the steps of:

deleting a fixed length field from said header; and coding an N-bit packet identifier from said header into an M-bit reference value, where M<N;

wherein said deleting and coding steps reduce an amount of data in said first packet corresponding to a temporal gap between said first packet and an adjacent packet.

8. A method in accordance with claim 7 comprising the further steps of decompressing said header by:

inserting said fixed length byte back into said header;

decoding said M-bit reference value to recover said N-bit packet identifier; and substituting said M-bit reference value in said header with said recovered N-bit packet identifier.

9. Apparatus for receiving a packet stream having fixed length packets and selectively processing data carried in said stream for output to a computer, comprising:

a receiver for recovering said packet stream;

a packet identifier filter for selecting particular packets from the recovered packet stream;

a disk controller for receiving the packets selected by said filter and managing the transfer of packet data from said packets to and from a buffer;

a data bus coupled to said disk controller for communicating said packet data from said buffer to said computer; and a data compression stage prior to said disk controller for compressing packets from the recovered packet stream in order to provide a temporal gap between data carried by successive packets to be provided to the disk controller;

said temporal gap corresponding to a gap that is required by said disk controller to process said successive packets.

10. Apparatus in accordance with claim 9 wherein said data compression stage compresses header portions of packets provided to said disk controller.

11. Apparatus in accordance with claim 10 wherein said header portions comprise transport headers of an MPEG Transport Stream.

12. Apparatus in accordance with claim 11 wherein said compression stage compresses a transport header by deleting a synchronization field therefrom, and coding an N-bit MPEG packet identifier (PID) from the transport header into an M-bit PID reference, where M<N.

13. Apparatus in accordance with claim 12 wherein said compression stage comprises a lookup table for coding said N-bit PID into said M-bit PID reference.

14. Apparatus in accordance with claim 12 wherein said synchronization byte has a known value and said N-bit PID is recoverable from said M-bit PID reference, whereby said compression stage provides lossless compression.

15. Apparatus in accordance with claim 12 wherein said compression stage uses index coding to provide said M-bit PID reference, in which $2^M/2$ possible PID references are designated by a most significant bit (MSB) having a first binary value and the remaining $2^M/2$ possible PID references are designated by a most significant bit (MSB) having a second binary value.

16. Apparatus in accordance with claim 9 wherein said data compression stage is coupled to receive and compress the packets selected by said filter.

17. Apparatus in accordance with claim 10 wherein said header portions comprise cell headers of an ATM cell stream.

18. Apparatus in accordance with claim 17 wherein said compression stage compresses a cell header by performing at least one of a deleting and coding step, where said deleting step comprises deleting at least one fixed length field from said header and said coding step comprises coding at least one of an N-bit virtual path identifier (VPI) and an N-bit virtual circuit identifier (VCI) from the transport header into an M-bit reference value, where M<N.

19. Apparatus in accordance with claim 18 wherein said compression stage comprises a lookup table for coding said at least one N-bit VPI or VCI into said M-bit reference value.

20. Apparatus in accordance with claim 18 wherein said at least one fixed length field comprises at least one of an ATM header error correction (HEC) field, a generic flow control (GFC) field and a VPI field.

21. Apparatus in accordance with claim 18 wherein said at least one fixed length field has a calculable value and said at least one N-bit VPI or VCI is recoverable from said M-bit PID reference, whereby said compression stage provides lossless compression.

22. Apparatus in accordance with claim 18 wherein said compression stage uses index coding to provide said M-bit reference value, in which $2^M m/2$ possible reference values are designated by a most significant bit (MSB) having a first binary value and the remaining $2^M/2$ possible reference values are designated by a most significant bit (MSB) having a second binary value.

* * * * *

UNITED STATES PATENT AND TRADEMARK OFFICE
CERTIFICATE OF CORRECTION

PATENT NO. : 5,835,730
DATED : Nov. 10, 1998
INVENTOR(S) : Grossman et al.

It is certified that error appears in the above-identified patent and that said Letters Patent is hereby corrected as shown below:

Claim 1, line 9, change "gas" to -- gap --

Claim 22, line 3, change "$2^M m/2$" to -- $2^M/2$ --

Signed and Sealed this

Sixteenth Day of March, 1999

Attest:

Q. TODD DICKINSON

Attesting Officer

Acting Commissioner of Patents and Trademarks